US011518473B2

(12) United States Patent
Philbrook (10) Patent No.: US 11,518,473 B2
(45) Date of Patent: Dec. 6, 2022

(54) BALANCED MOTORCYCLE POWERTRAIN (71) Applicant: Harry Philbrook, Aurora, CO (US)

(72) Inventor: Harry Philbrook, Aurora, CO (US)

( * ) Notice: Subject to any disclaimer, the term of this patent is extended or adjusted under 35 U.S.C. 154(b) by 260 days.

(21) Appl. No.: 17/114,695

(22) Filed: Dec. 8, 2020

(65) Prior Publication Data
US 2021/0245834 A1 Aug. 12, 2021

Related U.S. Application Data

(60) Provisional application No. 62/972,752, filed on Feb. 11, 2020.

(51) Int. Cl.
| *B62M 7/02* | (2006.01) |
| *B62M 9/00* | (2006.01) |
| *B62K 21/02* | (2006.01) |
| *F02B 67/06* | (2006.01) |
| *F16D 7/00* | (2006.01) |
| *F02B 39/04* | (2006.01) |
| *B62L 1/00* | (2006.01) |

(52) U.S. Cl.
CPC .............. *B62M 7/02* (2013.01); *B62K 21/02* (2013.01); *B62L 1/00* (2013.01); *B62M 9/00* (2013.01); *F02B 39/04* (2013.01); *F02B 67/06* (2013.01); *F16D 7/00* (2013.01)

(58) Field of Classification Search
CPC ........... B62M 7/02; B62M 9/00; B62K 21/02; B62K 11/04; B62L 1/00; F02B 39/04; F02B 67/06; F02B 61/02; F16D 7/00; F16D 43/04
See application file for complete search history.

(56) References Cited

U.S. PATENT DOCUMENTS

| 4,265,329 | A | 5/1981 | de Cortanze |
| 4,697,664 | A | 10/1987 | Kohyama |
| 4,887,687 | A | 12/1989 | Asai |
| 7,500,476 | B2 | 3/2009 | Tawarada |
| 7,870,924 | B2 | 1/2011 | Fujita |
| 9,327,802 | B1 | 5/2016 | Chang |
| 2016/0258347 | A1* | 9/2016 | Riley ................... F01M 13/028 |
| 2017/0114681 | A1* | 4/2017 | Tsukamoto ............ F01M 11/02 |
| 2017/0114702 | A1* | 4/2017 | Okita ........................ F01P 11/04 |
| 2017/0114860 | A1* | 4/2017 | Yamauchi .............. F01M 11/02 |
| 2017/0226971 | A1* | 8/2017 | Yamamoto .............. F02B 61/02 |
| 2018/0178827 | A1 | 6/2018 | Araki |
| 2019/0010859 | A1* | 1/2019 | Okita ................... F02B 29/0406 |
| 2019/0285172 | A1* | 9/2019 | Maebashi ............... F16H 59/70 |
| 2021/0226217 | A1* | 7/2021 | Sofue .................... H01M 4/583 |

FOREIGN PATENT DOCUMENTS

WO 201904944 3/2019

* cited by examiner

*Primary Examiner* — Kevin Hurley
*Assistant Examiner* — Marlon A Arce
(74) *Attorney, Agent, or Firm* — Leyendecker & Lemire, LLC (57) ABSTRACT

A balanced motorcycle powertrain is described. Embodiments of the balanced motorcycle powertrain include components mounted to a frame of a motorcycle such that the powertrain can be evenly balanced about a centerline of the frame. The balanced motorcycle powertrain can include, but is not limited to, a motor, a transmission, a pair of clutches, a clutch shaft, a crank shaft, a pair of superchargers, a pair of chains, a pair of rear sprockets, and a rear wheel. Each of the components can be oriented such that the powertrain is substantially balanced about the centerline of the frame.

20 Claims, 7 Drawing Sheets

FIG. 3

BALANCED MOTORCYCLE POWERTRAIN

CROSS-REFERENCE TO RELATED APPLICATION

This application claims the benefit of U.S. Provisional Application No. 62/972,752, filed Feb. 11, 2020.

BACKGROUND

Current top-fuel (e.g., nitro-methane fuel) motorcycles typically have a side-to-side imbalance in relation to an engine and drivetrain. This leads the motorcycle to tilt to one side or the other requiring a rider to counter the imbalance by leaning to an opposing side. As usually seen with top fuel motorcycles, the riders are often trying to correct the balance of the motorcycle to ensure they are going as straight as possible during a race. The imbalance is generally due to one side of a motorcycle being heavier than the other. As such, the front and rear tire have an imbalance of weight from a centerline of the motorcycle. The imbalance can cause a motorcycle to "fish-tail" on the rear end under hard, powerful acceleration.

A means for correcting the weight imbalance is needed for drag racing motorcycles such that the maximum amount of power is translated from the engine to tires without causing the motorcycle to tilt one way or another.

DETAILED DESCRIPTION

Embodiments of the present invention include a motorcycle powertrain. The motorcycle powertrain can be configured to be balanced along a centerline from a front wheel to a rear wheel bisecting the motorcycle. For instance, when fully built, the motorcycle would balance evenly when standing still. A powertrain of the motorcycle can be mirrored on either side of the centerline. Typically, components of the motorcycle can be mirrored on each side of the centerline of the motorcycle. The motorcycle can include typical components of a regular motorcycle including, but is not limited to, a frame, an engine, a front wheel, a rear wheel, brakes, handlebars, a gas tank, etc. Some of the components may be duplicated to achieve the mirror image look and achieve a balanced motorcycle. For instance, disc brakes can be integrated on either side of the rear wheel and/or front wheel.

In one instance, the motorcycle may include a dual final drive coupled to either side of a rear wheel. For example, a chain drive can be mounted on either side of the frame of the motorcycle. The pair of chain drives can each be operatively connected to one side of the rear wheel. An engine of the motorcycle can typically be transversely mounted with a pair of superchargers mounted to each end of the engine. As can be appreciated, either side of the motorcycle along a centerline can be a mirror image of the other side. The superchargers can be operatively connected to a crankshaft of the engine. A pair of slip clutches can be coupled on either side of the engine. The slip clutches can each be operatively coupled to respective chain drives of the pair of chain drives. In one embodiment, centrifugal clutches can be implemented as the slip clutches. It is to be appreciated that other types of slip clutches can be implemented. In some embodiments, a mechanical coupling can be implemented to couple the crankshaft to the slip clutches. For instance, a chain drive or drive shaft may be implemented.

In one embodiment, the engine can be mounted to the frame such that the engine is weighted evenly on either side of a centerline of the motorcycle frame. The balanced motorcycle powertrain may include a pair of superchargers mounted on either side of the engine. Typically, the superchargers can be coupled to opposite sides of a crankshaft. Each of the superchargers can include a drive-belt operatively connected to the crankshaft of the engine. In one instance, the engine can be transversely mounted to the frame. A mechanical coupling (e.g., chain drive, belt drive, drive shaft, etc.) may operatively connect the crankshaft of the engine to a pair of slip clutches. Typically, a centrifugal clutch can be implemented as the slip clutch. A slip clutch can be located on either side of the centerline of the motorcycle and operatively connected to the crankshaft via the mechanical coupling. Each of the slip clutches can be operatively connected to a chain drive (or belt drive) that can be connected to both sides of a rear wheel. The chain drives can be located on either side of the centerline of the motorcycle and can be coupled between the slip clutches and the rear wheel. As can be appreciated, the components can be mirrored on either side of the centerline providing a balanced motorcycle powertrain.

In another embodiment, the motor can be transversely mounted to the frame and a pair of superchargers can be coupled to a crankshaft of the engine on either side of the engine. A pair of slip clutches located on either side of the motorcycle can be coupled to the crankshaft of the engine. A chain drive (or similar mechanical device) can be coupled between each of the slip clutches and a pair of sprockets coupled to the rear wheel of the motorcycle. Of note, a chain drive can be located on either side of the motorcycle to provide balance along the centerline of the motorcycle. Effectively, each component of the powertrain can be mirrored on either side of the centerline of the motorcycle.

In one embodiment, a balanced motorcycle powertrain can be mounted to a frame having a centerline. The balanced motorcycle powertrain can include, but is not limited to, a motor, a transmission, a pair of superchargers, a pair of clutches, and a pair of chain drives. The motor can include a crank shaft and can be transversely mounted to the frame. The motor can be evenly weighted about the centerline of the frame. The transmission can be operatively connected to the motor and can include a clutch shaft. The clutch shaft can be operatively connected to the crank shaft. The pair of superchargers can each be operatively coupled to an opposite end of the crank shaft. The pair of superchargers can counterbalance each other on either side of the centerline of the frame. The pair of clutches can each be operatively coupled to opposite ends of the clutch shaft. The pair of clutches can counterbalance each other on either side of the centerline of the frame. The pair of chain drives can each include a chain and a pair of sprockets. Each pair of sprockets can include a first sprocket being coupled to the clutch shaft and a second sprocket being coupled to a rear wheel.

In another embodiment, a balanced motorcycle powertrain can be mounted to a frame having a centerline. The balanced motorcycle powertrain can include, but is not limited to, a motor, a transmission, a pair of superchargers, a pair of clutches, and a pair of chain drives. The motor can include a crank shaft and can be transversely mounted to the frame. The motor can be evenly weighted about the centerline of the frame. The transmission can be operatively connected to the motor and can include a clutch shaft. The pair of superchargers can each be operatively coupled to an opposite end of the crank shaft. The pair of superchargers can counterbalance each other on either side of the centerline of the frame. The pair of clutches can each be operatively coupled to opposite ends of the clutch shaft. The pair of clutches can counterbalance each other on either side of the centerline of the frame. The pair of chain drives can each include a chain and a pair of sprockets. Each pair of sprockets can include a first sprocket being coupled to the clutch shaft and a second sprocket being coupled to a rear wheel.

It is to be appreciated that the described embodiments are not meant to be limiting and other configurations are contemplated.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

A First Embodiment of a Motorcycle Powertrain

Figure 1A:
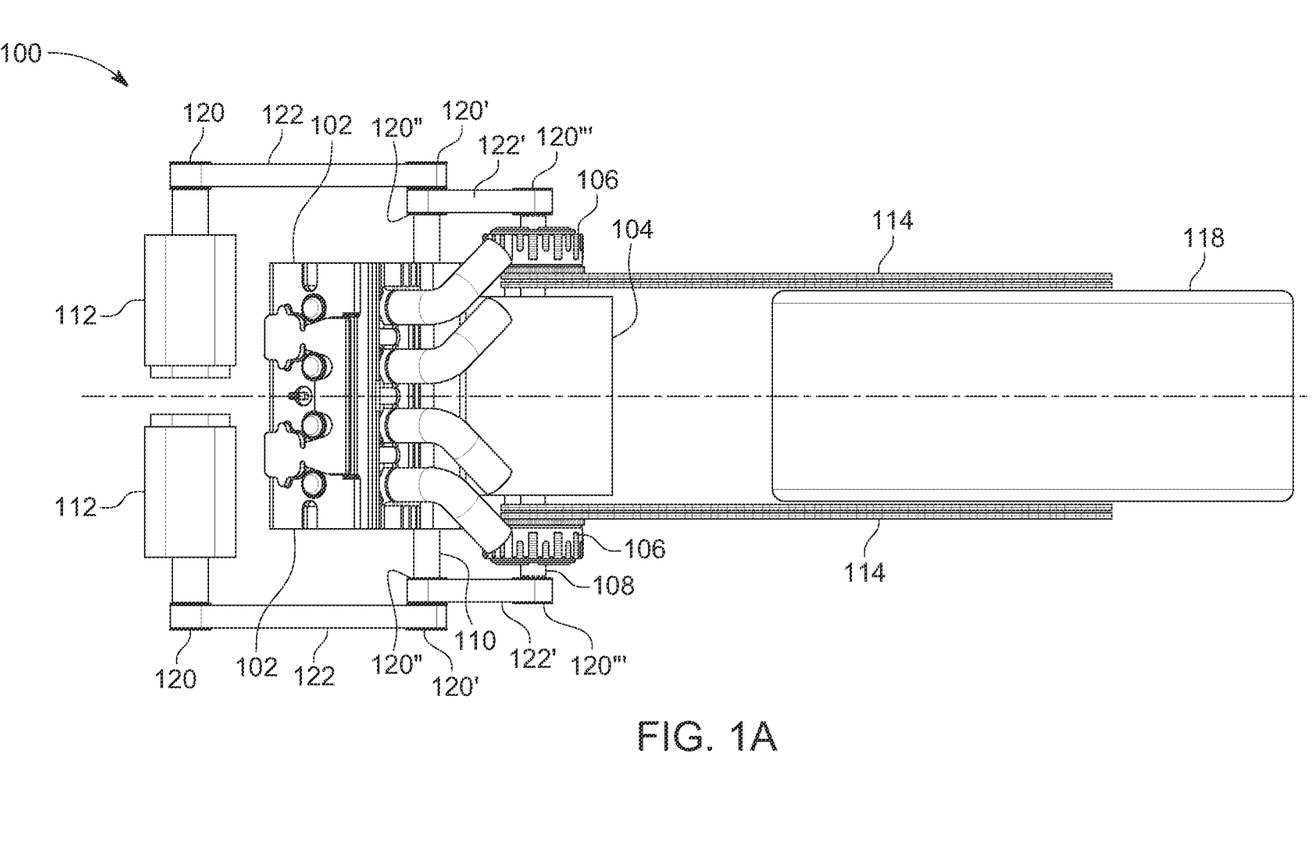
FIG. 1A is a top view of a balanced motorcycle powertrain according to one embodiment of the present invention.
Figure 1B:
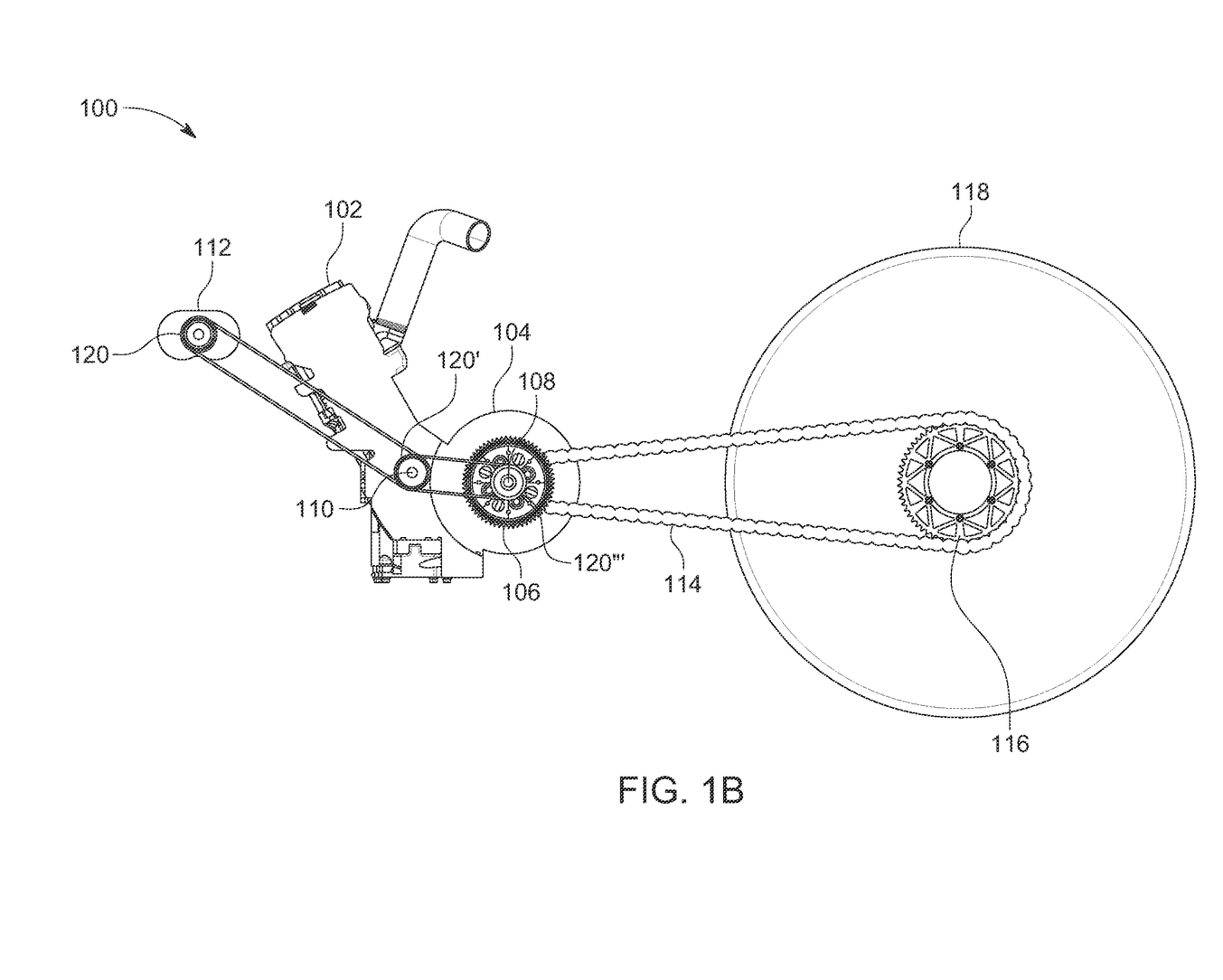
FIG. 1B is a side view of a balanced motorcycle powertrain according to one embodiment of the present invention.
Figure 1C:
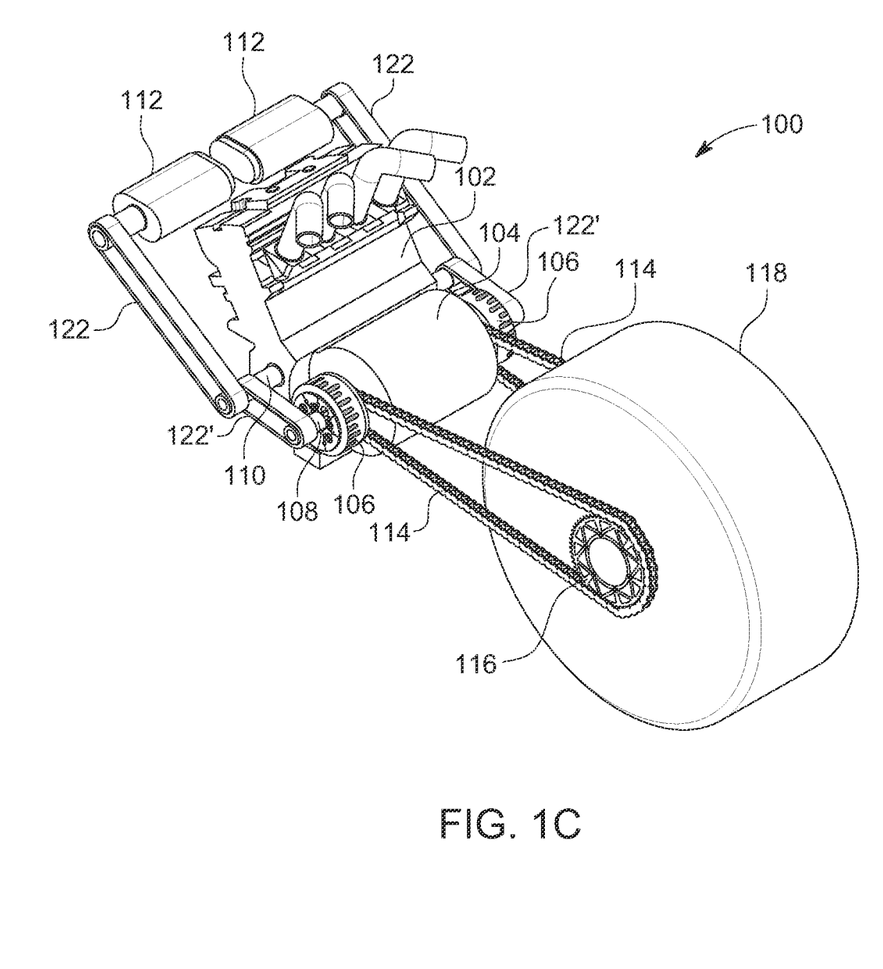
FIG. 1C is a back, perspective view of a balanced motorcycle powertrain according to one embodiment of the present invention.

Referring to FIGS. 1A-1C, detailed diagrams of an embodiment 100 of a motorcycle powertrain is illustrated. Typically, the motorcycle powertrain 100 can be implemented with top-fuel motorcycles. The motorcycle powertrain 100 can provide a substantially balanced motorcycle along a centerline of the motorcycle. Of note, the illustrated figures include the powertrain (e.g., engine and drivetrain) while common components well known to one of ordinary skill in the art not illustrated. For example, a frame, a front wheel, front forks, etc. are not illustrated.

Referring to FIG. 1A, a top view of the motorcycle powertrain 100 is illustrated. Referring to FIG. 1B, a side view of the motorcycle powertrain 100 is illustrated. Referring to FIG. 1C, a back, perspective view of the motorcycle powertrain 100 is illustrated.

Referring generally to FIGS. 1A-1C, the motorcycle powertrain 100 can include, but is not limited to, a motor 102, a transmission 104, a pair of clutches 106, a clutch shaft 108, a crank shaft 110, a pair of superchargers 112, a pair of chains 114, a pair of rear sprockets 116, and a rear wheel 118.

The motor 102 can be mounted transversely to a frame such that the motor 102 is substantially balanced about a centerline of the motorcycle. Stated alternatively, the motor 102 can be mounted to a frame such that the motor 102 can be weighted evenly on either side of a centerline of the motorcycle. Typically, an intake side of the motor 102 can be on a front side of the motorcycle and an exhaust of the motor 102 can be face back.

The transmission 104 can be operatively connected to the motor 102 and the pair of clutches 106. Similar to the motor 102, the transmission 104 can be mounted to the frame such that the transmission 104 may be balanced about the centerline of the motorcycle.

Typically, the pair of clutches 106 can each be slip clutches. In one example, a centrifugal clutch can be implemented for each of the slip clutches 106. It is to be appreciated that other types of clutches are contemplated and not outside a scope of the present invention. As shown, the slip clutches 106 can be located on either side of the centerline of the motorcycle and can be operatively connected to the crank shaft 110 via a mechanical coupling. The slip clutches 106 can each be operatively connected to one of the chains 114. The chains 114 can be located on either side of the centerline of the motorcycle and can be coupled between the slip clutches 106 and the rear wheel 118.

The pair of superchargers 112 can be mounted on either side of the motor 102 such that weight of the superchargers 112 can be balanced about the centerline of the motorcycle. Of note, intake manifolds commonly implemented with superchargers are not illustrated. As shown, the superchargers 112 can be operatively coupled to opposite sides of the crank shaft 110 via mechanical couplings. In one instance, each of the superchargers 112 can include a mechanical coupling operatively connected to the crank shaft 110 of the motor 102.

The clutch shaft 108 and the crank shaft 110 can each include a plurality of pulleys 120 for receiving a mechanical coupling thereon. In one instance, a plurality of belts 122 can be implemented to operatively connect components of the motorcycle powertrain 100 together. It is to be appreciated that other components similar to belts (e.g., chains, shaft, etc.) can be implemented. As shown, a first pair of belts 122 can be implemented to operatively couple the superchargers 112 to the crank shaft 110 and a second pair of belts 122' can be implemented to operatively couple the crank shaft 110 to the clutch shaft 108. In a typical implementation, the first pair of belts 122 can be connected to a first pair of pulleys 120 on the superchargers 112 and a second pair of pulleys 120' on the crank shaft 110. The superchargers 112 can be connected to opposite ends of the crank shaft 110 via the first pair of belts 122 and the second set of pulleys 120'. The second pair of belts 122' can be connected between a third pair of pulleys 120" on the crank shaft 110 and a fourth set of pulleys 120''' on the clutch shaft 108. The opposite ends of the crank shaft 110 can be connected to respective ends of the clutch shaft 108.

As shown, the pair of clutches 106, the pair of superchargers 112, the pair of chains 114, and the pair of rear sprockets 116 can mirror one another on either side of the centerline of the motorcycle.

A Second Embodiment of a Motorcycle Powertrain

Figure 2A:
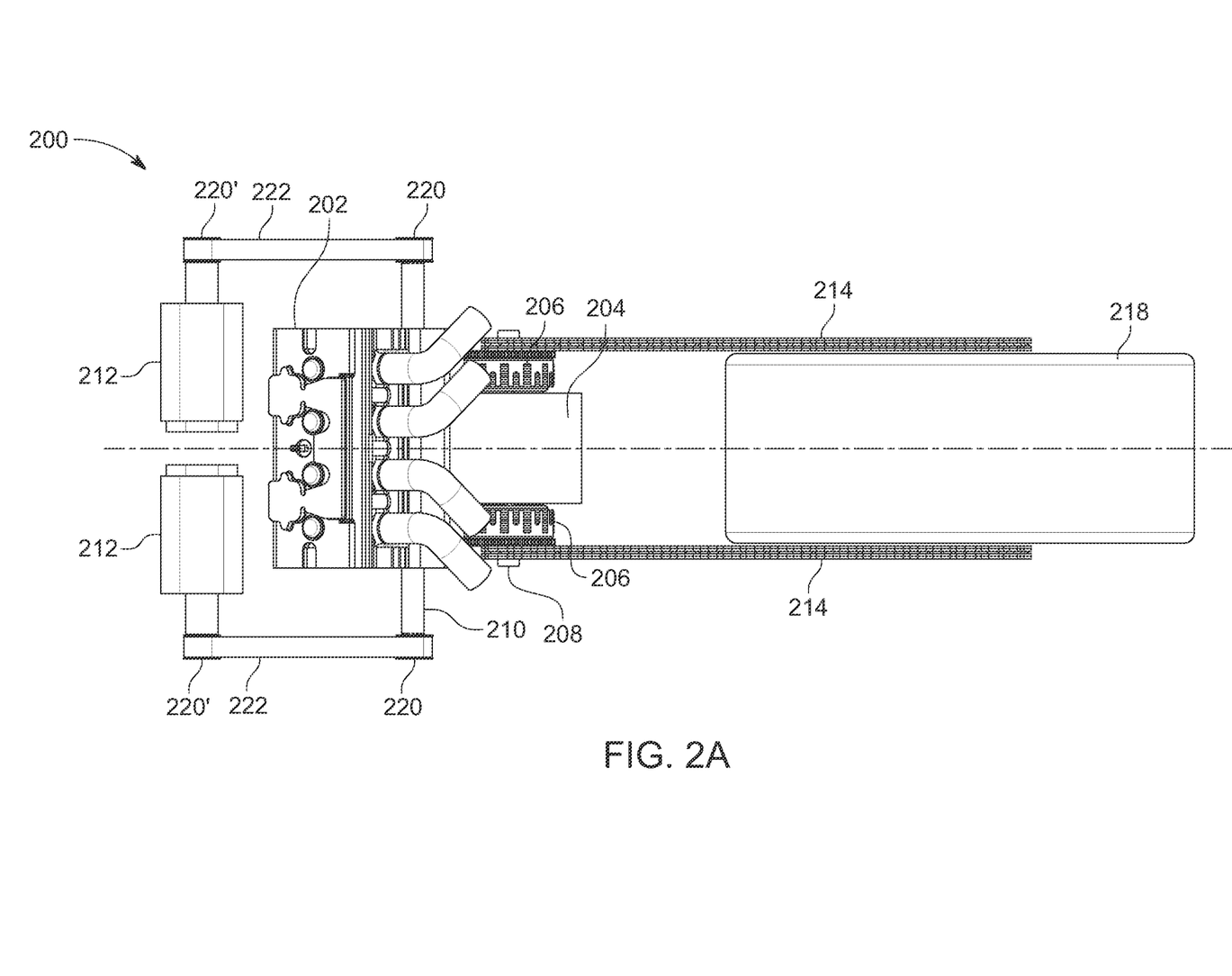
FIG. 2A is a top view of a balanced motorcycle powertrain according to one embodiment of the present invention.
Figure 2B:
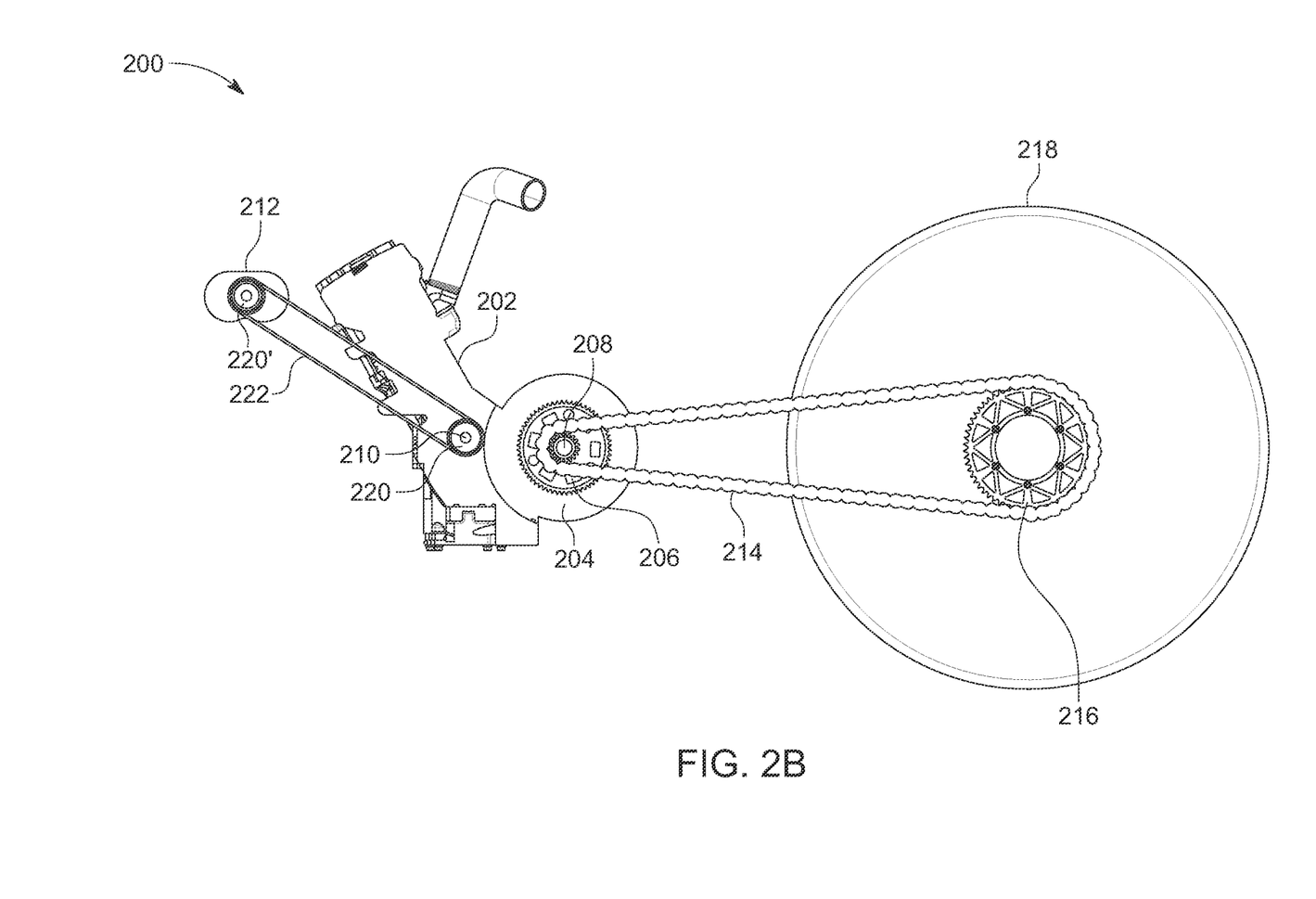
FIG. 2B is a side view of a balanced motorcycle powertrain according to one embodiment of the present invention.
Figure 2C:
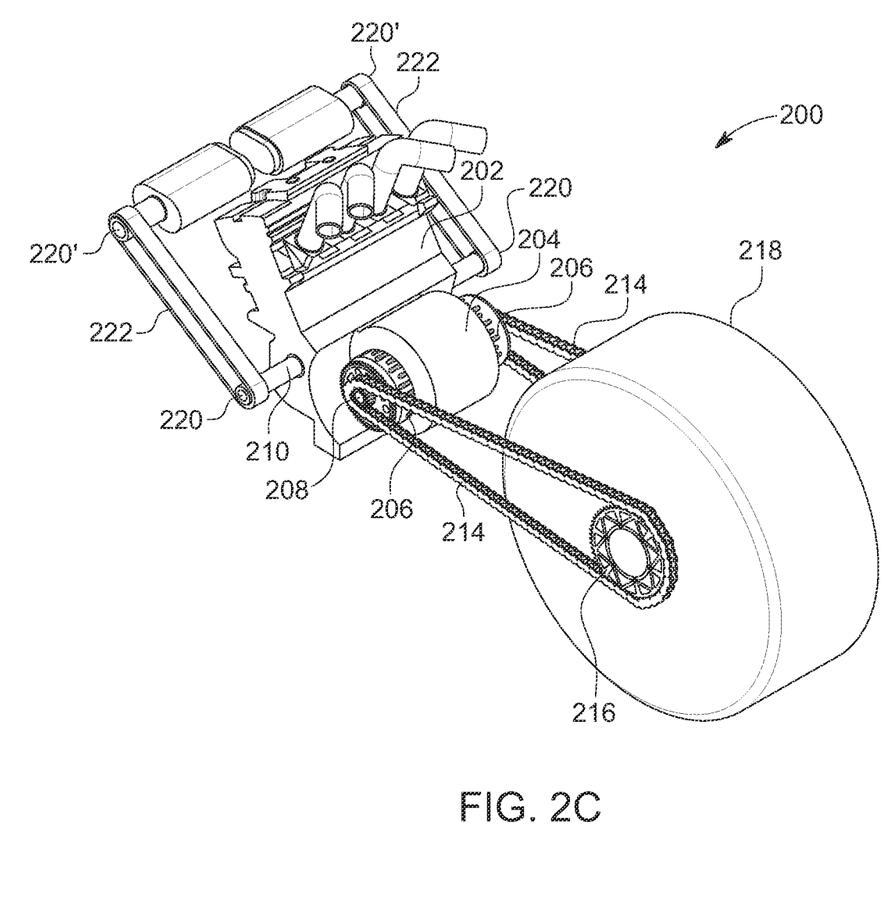
FIG. 2C is a back, perspective view of a balanced motorcycle powertrain according to one embodiment of the present invention.

Referring to FIGS. 2A-2C, detailed diagrams of a second embodiment 200 of a motorcycle powertrain are illustrated. Similar to the first embodiment balanced motorcycle, the second embodiment motorcycle powertrain 200 can be implemented as a top-fuel motorcycle. The second embodiment motorcycle powertrain 200 can be configured differently from the first embodiment motorcycle powertrain 100 but can include similar components.

Referring to FIG. 2A, a top view of the motorcycle powertrain 200 is illustrated. Referring to FIG. 2B, a side view of the motorcycle powertrain 200 is illustrated. Referring to FIG. 2C, a back, perspective view of the motorcycle powertrain 200 is illustrated.

Referring generally to FIGS. 2A-2C, the motorcycle powertrain 200 can include, but is not limited to, a motor 202, a transmission 204, a pair of clutches 206, a clutch shaft 208, a crank shaft 210, a pair of superchargers 212, a pair of chains 214, a pair of rear sprockets 216, and a rear wheel 218.

The motor 202 can be mounted transversely to a frame such that the motor 202 is substantially balanced about a centerline of the motorcycle. Stated alternatively, the motor 202 can be mounted to a frame such that the motor 202 can be weighted evenly on either side of a centerline of the motorcycle. Typically, an intake side of the motor 202 can be on a front side of the motorcycle and an exhaust of the motor 202 can be face back.

The transmission 204 can be operatively connected to the motor 202 and the pair of clutches 206. Similar to the motor 202, the transmission 204 can be mounted to the frame such that the transmission 204 may be balanced about the centerline of the motorcycle.

Typically, the pair of clutches 206 can each be slip clutches. In one example, a centrifugal clutch can be implemented for each of the slip clutches 206. It is to be appreciated that other types of clutches are contemplated and not outside a scope of the present invention. As shown, the slip clutches 206 can be located on either side of the centerline of the motorcycle. The slip clutches 206 can each be operatively connected to one of the chains 214. The chains 214 can be located on either side of the centerline of the motorcycle and can be coupled between the slip clutches 206 and the pair of sprockets 216 on the rear wheel 218.

The pair of superchargers 212 can be mounted on either side of the motor 202 such that weight of the superchargers 212 can be balanced about the centerline of the motorcycle. Of note, intake manifolds commonly implemented with superchargers are not illustrated. As shown, the superchargers 212 can be operatively coupled to opposite sides of the crank shaft 210 via mechanical couplings. In one instance, each of the superchargers 212 can include a mechanical coupling operatively connected to the crank shaft 210 of the motor 202.

The crank shaft 210 can include a pair of pulleys 220 for receiving a mechanical coupling thereon. In one instance, the mechanical coupling can be a pair of belts 222 to operatively connect components of the motorcycle powertrain 200 together. It is to be appreciated that other components similar to belts (e.g., chains, shaft, combinations thereof, etc.) can be implemented. As shown, the pair of belts 222 can be implemented to operatively couple the superchargers 212 to the crank shaft 210. In a typical implementation, the pair of belts 222 can be connected to a pulley 220' on each of the superchargers 212 and the pair of pulleys 220 on the crank shaft 210. The superchargers 212 can be operatively connected to opposite ends of the crank shaft 210.

As shown, the pair of clutches 206, the pair of superchargers 212, the pair of chains 214, and the pair of rear sprockets 216 can mirror one another on either side of the centerline of the motorcycle. By mirroring the components, the components can counterbalance each other on either side of the centerline of the motorcycle.

An Embodiment of a Motorcycle

Figure 3:
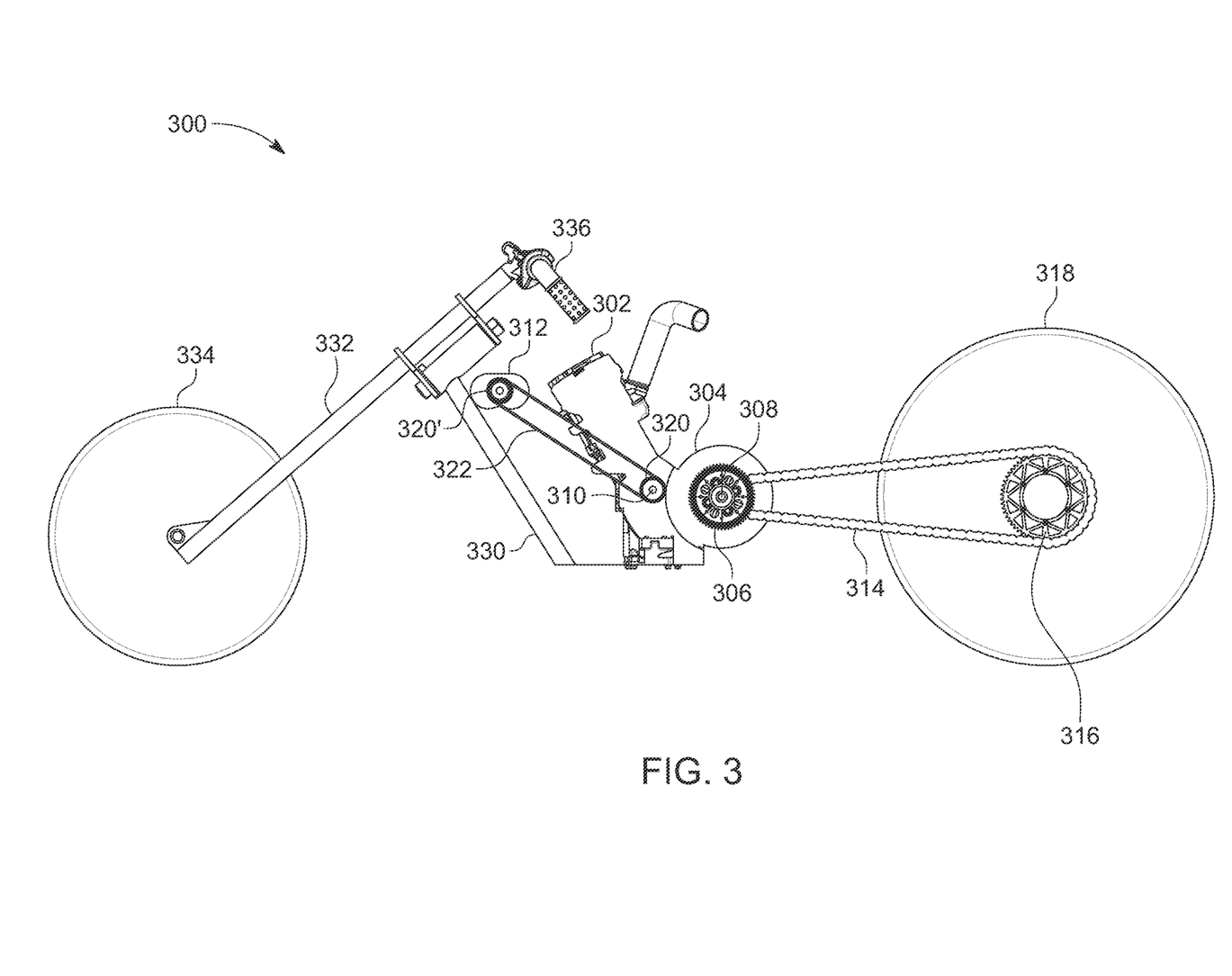
FIG. 3 is a side view of a motorcycle including a balanced powertrain according to one embodiment of the present invention.

Referring to FIG. 3, a side view of an embodiment 300 of a motorcycle is illustrated. The motorcycle 300 can include a powertrain similar to the first embodiment powertrain 100 and/or the second embodiment powertrain 200.

The motorcycle 300 can include, but is not limited to, components 302-320 substantially similar to the components of the first embodiment powertrain 100 (or components of the second embodiment powertrain 200), a frame 330, a front fork 332, a front wheel 334, and a steering assembly 336.

Typically, the steering assembly 336 can be operatively connected to the front fork 332 to allow for movement of the front wheel 334. The steering assembly 336 can be coupled to the frame 330. The components 302-320 can be directly, or indirectly, connected to the frame 330.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A balanced motorcycle powertrain mounted to a frame having a centerline, the balanced motorcycle powertrain comprising:
   a motor including a crank shaft, the motor being transversely mounted to the frame and evenly weighted about the centerline;
   a transmission operatively connected to the motor and including a clutch shaft, the clutch shaft being operatively connected to the crank shaft;
   a pair of superchargers each being operatively coupled to an opposite end of the crank shaft, the pair of superchargers counterbalancing each other on either side of the centerline;
   a pair of clutches each being operatively coupled to opposite ends of the clutch shaft, the pair of clutches counterbalancing each other on either side of the centerline; and
   a pair of chain drives each including a chain and a pair of sprockets, each pair of sprockets including a first sprocket being coupled to the clutch shaft and a second sprocket being coupled to a rear wheel.

2. The balanced motorcycle powertrain of claim 1, wherein a front fork, a front wheel, and a steering assembly are operatively coupled to the frame.

3. The balanced motorcycle powertrain of claim 2, wherein the motorcycle remains substantially balanced about the centerline when the front fork, front wheel, and the steering assembly are operatively coupled to the frame.

4. The balanced motorcycle powertrain of claim 1, wherein the pair of chain drives counterbalance each other on either side of the centerline.

5. The balanced motorcycle powertrain of claim 1, wherein the transmission is evenly weighted about the centerline.

6. The balanced motorcycle powertrain of claim 1, wherein the rear wheel includes a disc brake mounted on either side of the rear wheel.

7. The balanced motorcycle powertrain of claim 1, wherein the pair of clutches are each slip clutches.

8. A balanced motorcycle powertrain mounted to a frame having a centerline, the balanced motorcycle powertrain comprising:
   a motor including a crank shaft, the motor being transversely mounted to the frame and evenly weighted about the centerline;
   a transmission operatively connected to the motor and including a clutch shaft;
   a pair of superchargers each being operatively coupled to an opposite end of the crank shaft, the pair of superchargers counterbalancing each other on either side of the centerline;
   a pair of clutches each being operatively coupled to opposite ends of the clutch shaft, the pair of clutches counterbalancing each other on either side of the centerline; and
   a pair of chain drives each including a chain and a pair of sprockets, each pair of sprockets including a first sprocket being coupled to the clutch shaft and a second sprocket being coupled to a rear wheel.

9. The balanced motorcycle powertrain of claim 8, wherein a front fork, a front wheel, and a steering assembly are operatively coupled to the frame.

10. The balanced motorcycle powertrain of claim 9, wherein the motorcycle remains substantially balanced about the centerline when the front fork, front wheel, and the steering assembly are operatively coupled to the frame.

11. The balanced motorcycle powertrain of claim 8, wherein the pair of chain drives counterbalance each other on either side of the centerline.

12. The balanced motorcycle powertrain of claim 8, wherein the transmission is evenly weighted about the centerline.

13. The balanced motorcycle powertrain of claim 8, wherein the rear wheel includes a disc brake mounted on either side of the rear wheel.

14. The balanced motorcycle powertrain of claim 8, wherein the pair of clutches are each slip clutches.

15. A motorcycle including a balanced powertrain, the motorcycle comprising:
   a frame having a centerline;
   a front fork coupled to the frame;
   a steering assembly coupled to the frame;
   a front wheel coupled to the front fork;
   a rear wheel coupled to the frame;
   a motor including a crank shaft, the motor being transversely mounted to the frame and evenly weighted about the centerline;
   a transmission operatively connected to the motor and including a clutch shaft, the clutch shaft being operatively connected to the crank shaft;
   a pair of superchargers each being operatively coupled to an opposite end of the crank shaft, the pair of superchargers counterbalancing each other on either side of the centerline;
   a pair of clutches each being operatively coupled to opposite ends of the clutch shaft, the pair of clutches counterbalancing each other on either side of the centerline; and
   a pair of chain drives each including a chain and a pair of sprockets, each pair of sprockets including a first sprocket being coupled to the clutch shaft and a second sprocket being coupled to the rear wheel.

16. The motorcycle of claim 15, wherein the motorcycle is balanced about the centerline of the frame.

17. The motorcycle of claim 15, wherein the transmission is evenly weighted about the centerline.

18. The motorcycle of claim 15, wherein the rear wheel includes a disc brake mounted on either side of the rear wheel.

19. The motorcycle of claim 15, wherein the pair of chain drives counterbalance each other on either side of the centerline.

20. The motorcycle of claim 15, wherein the pair of clutches are each slip clutches.

* * * * *